United States Patent Office 2,876,107
Patented Mar. 3, 1959

2,876,107

DIETETIC FLUID FOOD COMPOSITION

Pranas Jucaitis and Irene D. Bliudzius, Chicago, Ill., and Norman P. Rockwell, Wilmington, Del., assignors, by direct and mesne assignments, to E. I. du Pont de Nemours and Company, Wilmington, Del., a corporation of Delaware No Drawing. Application March 25, 1957
Serial No. 647,992

10 Claims. (Cl. 99—141)

This invention relates to low calorie and diabetic food compositions which contain a Polyose used as a thickening agent.

Sugar not only sweetens but also supplies a thickening or viscosity building function in a number of common fluid and water containing foodstuffs. In order to prepare dietetic versions of such foods intended for those who must restrict their intake of carbohydrates or calories, or both, it is necessary to prepare such foods using no sugar or very little sugar.

Heretofore, it has been impossible to produce low calorie and dietetic foodstuffs which closely resemble normal calorie containing foods in taste and physical appearance by using thickening agents other than sugar. Such substitutes for carbohydrate-containing thickening agents have tended to be nutritive and have added back most, if not all, of the calories contained in the sugar removed. Often they were difficultly soluble in water. Frequently, their use altered food texture and eating quality to such an extent that the product was not appetizing or wholesome.

This invention relates to dietetic fluid food compositions containing a non-nutritive thickener having a volume consistency and appearance comparable to food compositions containing usual carbohydrate-containing thickeners. These non-nutritive thickeners are used just like other thickeners. One may add to the low-nutritive food product a non-caloric sweetener to obtain a sweetness level which one is accustomed to obtain with sugar when it is added in the same fashion. This makes low-calorie and low carbohydrate food compositions which are easily and pleasantly usable as conventional carbohydrate-containing foodstuffs.

Foodstuffs which can be prepared using a Polyose as thickening agent include all fluid or fluid containing food products which contain a sugar or a sugar-containing material which tends to affect product viscosity. When other materials in addition to sugar are used to provide greater thickening action than sugar alone can supply, a Polyose can be used in place of such materials to the extent necessary for obtaining food products of desired viscosity.

More specifically foodstuffs which can be prepared using a Polyose as a thickening agent include:

(1) *Beverages.*—Includes all non-alcoholic carbonated and uncarbonated soft drinks, such as drinks containing fruit and vegetable solids and juices, herbs, root-extracts, essential oils, and animal solids, extracts, and fluids. Specifically included, for example, are milk, root beer, and the like.

(2) *Syrups.*—Includes fountain syrups, table syrups, syrups prepared from natural products and syrups artificially synthesized. Specifically included, for example, are natural and artificial maple syrups, chocolate syrup, fruit flavored syrups, such as raspberry, cherry, and the like.

(3) *Toppings and sauces.*—Includes all flavors for preparations which can contain fruits, vegetables, meats, and all flavors. Specifically included, for example, are toppings containing strawberry syrup, whipped cream, caramel syrup, raspberry flavors, fresh and canned fruits, for example, peaches, pears, and the like.

(4) *Canned fruits and vegetables.*—Includes all fruits and vegetables preserved without jelling. Specifically included, for example, are all fresh fruits and candied sweet potatoes, apple sauce, and the like.

(5) *Puddings and pie fillings.*—Includes non-gelatin containing mixes of all flavors as well as those containing materials which are added in addition to sugar to provide greater thickening action than the sugar alone can supply. Specifically included, for example, are custards, tapioca, lemon chiffon, and the like.

(6) *Salad dressings.*—Includes dressings prepared with oil and water bases of all flavors. Specifically included, for example, are French dressing, mayonnaise, vinegar-containing, and the like.

(7) *Soups.*—Includes chilled, cream, vegetable and fruit stock soups and thick soups such as tomato normally containing sugar.

A Polyose can be used as a thickener for low-calorie and dietetic food compositions because it provides a viscosity and thickness corresponding to that obtained with usual sugar and carbohydrate-containing thickeners but is non-nutritive compared with usual thickeners.

A Polyose is a glucose polymer solid derived from starch by depolymerization followed by heat polymerization and described in detail in the Durand Patent 2,563,014. The Polyoses are sold by the Corn Products Refining Company. The Polyoses have a considerably different susceptibility to amylolytic enzymes than the original starch or its conventional degradation products. The products on test contain groups which act like very small amounts of reducing sugar, not in excess of about 5 to 7 percent in Polyose A. The reducing sugar is not construed as due to the presence of free glucose.

A preferred Polyose for purposes of the invention is Polyose C which can be described as a glucose polymer derived from starch by depolymerization followed by heat polymerization to such an extent that at 50 percent solids it gives a viscosity (Brookfield) of 20–100 poises at 70° F. More viscous or less viscous Polyoses can be used. Polyose A requires 67 percent, Polyose B 60 percent, and Polyose D requires only 40 percent of solids to give a viscosity equivalent to that of Polyose C.

Thus, foodstuffs can be prepared having a normal protein vitamin and mineral content but having less than normal carbohydrate content. To the diets of persons suffering, for example, from diabetes, obesity, or maybe just too much healthy appetite, can thus be added appetizing, wholesome food compositions containing Polyoses.

The quantity of Polyose used as a thickener in a food composition such as those described herein can be determined by reference to the viscosity of such food composition when prepared with usual sugar, sugar-containing, or, in certain instances, starch or other carbohydrate-containing thickening agents. The normal quantity of thickener can be replaced in whole or in part by appropriate amounts of a Polyose. The result is that dietetic foodstuffs are prepared which have a viscosity simulating that of foodstuffs prepared with customary thickeners but which have a lower calorie content.

Due to the variations in the fluid viscosity of various foodstuffs and in the viscosity of the different types of Polyose, the range of Polyose used in the food products of this invention will vary widely, generally from 3 to 80 percent by weight. More narrowly, this range is preferably between 8 and 60 percent by weight.

Non-caloric sweetener compositions which can be added to the product to keep it at a normal sweetness level include a non-caloric sweetener such as cyclamate and saccharin. The cyclamate can be any of the salts of N-cyclohexylsulfamic acid or the acid itself as described in Audrieth Patent 2,275,125. Of the salts, it is preferred to use an alkali salt such as calcium, sodium, potassium, magnesium, ammonium cyclamate and the like All of the salts of cyclamate may not be suitable in each and every type of foodstuff contemplatetd by the disclosure. It may be necessary to choose a salt, for example, which will be soluble without notable offtaste. Or it may be desirable, for example, to use salts which will not precipitate with such materials as tartrates, oxalates, and the like, if present.

Mixtures of the non-caloric sweetening agents can also be used. Mixtures of cyclamate and sorbitol can be used as more particularly described in the Gordon Patents 2,629,665 and 2,653,105. However, as sorbitol is nutritive, too much should not be used. When sodium cyclamate, calcium cyclamate, or other soluble cyclamate is used as a sweetening agent, the amount used will range from about .002 to 5 percent by weight of product. More narrowly, the amount used ranges from about .05 to 1.5 percent of weight of product.

Mixtures of cyclamate and saccharin can be substituted for the cyclamate only, provided one bears in mind the fact that saccharin is about 10 times sweeter than cyclamate. If a mixture of cyclamate in saccharin is used the range of amounts of non-nutritive sweetening agents used can be defined as follows:

(1) Weight percent of cyclamate+10× weight percent of saccharin= .002 to 5 weight percent of product
(2) Weight percent of cyclamate+10 weight percent of saccharin=.05 to 1.5 weight percent of product Either cyclamate or saccharin can be used to the exclusion of the other. Formulas 1 and 2 (above) remain correct when the weight percent of either cyclamate or saccharin is equal to zero. One preferred mixture of sweetening agents contains an alkali cyclamate such as sodium or calcium cyclamate used with saccharin in a cyclamate:saccharin weight ratio of 10:1.

Still other proportions of the low caloride sweeteners can be used as set out in the Gordon patents previously mentioned. In each instance, the quantities to be used in a particular food composition can be readily determined by reference to the sweetness level of such food composition when prepared with usual sugar-containing thickening agents. The dietetic food composition may be made more or less sweet than the non-dietetic food composition, as desired.

The relationship between the amount of Polyose used and the amount of cyclamate and saccharin mixture used in the product can be defined as follows:

(3)
$$\frac{\text{Weight percent of polyose}}{\text{Weight percent of cyclamate}+10\times\text{weight percent of saccharin}}=2 \text{ to } 800$$

More narrowly,
(4)
$$\frac{\text{Weight percent of polyose}}{\text{Weight percent of cyclamate}+10\times\text{weight percent of saccharin}}=5 \text{ to } 400$$

It may be desirable in certain cases, as when an extremely viscous fluid is needed, to "fortify" the Polyose thickening action by the use of such substances as gum arabic, cold water soluble carragheen, guar gum, gum tragacanths, gum ghatti, carboxy methylcellulose, methyl cellulose, hydrolyzed collagen, degraded gelatin, starch, tapioca and other thickening agents normally used in food. Some of these substances, particularly the last named, have nutritive value and too much should not be used.

The compositions of the invention can include additives such as those shown in the Gordon patents and in Brenner 2,691,591.

The compositions of my invention can be sold as dry mixtures to be prepared by the buyer into the final food product for consumption. Perishable constituents of the food composition are often then excluded (such as whole eggs, milk, and certain shortenings). The weight ranges of Polyose used in such dry compositions are dependent upon the concentration of Polyose desired in the finished food product.

Representative examples of foodstuffs using a Polyose as a thickening agent follow. While these examples each use proportions suitable for the particular food composition shown and described, the determination of other suitable proportions for the other food composittions included in this invention can readily be made. Standard manufacturing procedures are applicable to all formulations.

EXAMPLE 1

*Dietetic beverage concentrate*

A beverage concentrate is prepared having the following ingredients:

| | Pounds |
|---|---|
| Polyose C | 6.50 |
| Sodium cyclamate | .20 |
| Citric acid | .12 |
| Root beer flavor | .25 |
| Water | 2.91 |

Polyose is dissolved in water and then other ingredients are added. The concentrate is mixed until all solid ingredients go into solution.

The resulting beverage concentrate is diluted at the rate of 1 part concentrate to 5 parts water, carbonated or not, to make a finished beverage.

The above composition excluding water can be sold as a powdered beverage concentrate to be dissolved in water and fully prepared by others.

Similar compositions can be prepared using either saccharin or mixture of cyclamate and saccharin. Sweeter or less sweet compositions can be prepared using more or less of these sweetening agents proportionately. Also, similar compositions can be prepared using proportionately more or less of a Polyose than instantly shown. Polyose A, B, or D can be used in amounts to give viscosity equivalent to that when Polyose C is used.

EXAMPLE 2

*Dietetic carbonated beverage*

A carbonated beverage having a thickness comparable to those made with sugar prepared using a Polyose, as follows:

First, a concentrate is prepared:

| | | |
|---|---|---|
| Sodium cyclamate | lb | .002 |
| Citric acid | lb | .002 |
| Ginger ale flavoring | lb | .002 |
| Polyose D | lb | .08 |
| Water | oz | 2.00 |

The Polyose is dissolved in water and then the other ingredients are added.

Then, the concentrate is placed in a 12 oz. bottle and about 10 ozs. carbonated water are added.

EXAMPLE 3

*Dietetic carbonated beverage*

A carbonated beverage having a thickness comparable to those made with sugar is prepared using a Polyose, as follows:

First, a concentrate is prepared:

| | | |
|---|---|---|
| Calcium cyclamate | lb | .005 |
| Citric acid | lb | .002 |
| Black cherry flavor | lb | .002 |
| Polyose C | lb | .13 |
| Water | oz | 2.00 |

Then this concentrate is placed in a 12 oz. bottle and about 10 ozs. carbonated water are added.

EXAMPLE 4

Dietetic maple syrup

A low-calorie imitation maple syrup formulation is prepared as follows:

| Ingredient | Percent Composition by Weight | (32 ozs.) 1 Quart |
|---|---|---|
| | | Oz. |
| Part A: | | |
| Sodium Carboxy Methyl Cellulose | 0.34 | .11 |
| Polyose B | 10.60 | 3.39 |
| Water | 50.46 | 16.16 |
| Part B: | | |
| Sorbitol | 10.00 | 3.20 |
| Water | 27.30 | 8.74 |
| Calcium Cyclamate | 0.84 | .27 |
| Saccharin | 0.07 | .021 |
| Potassium Chloride | 0.20 | .014 |
| Citric Acid, Anhy. | 0.04 | .013 |
| Caramel Color, Powd. | 0.03 | .009 |
| Maple Flavor | 0.05 | .016 |
| Sorbic Acid | 0.07 | .021 |

PREPARATION (I) Part A:
 (1) Premix sodium carboxy methyl cellulose and Polyose B.
 (2) Use 1/5 to 1/3 of required water and heat to 85° to 90° C.
 (3) Add dry ingredients slowly, with moderate agitation.
 (4) Continue to stir until ingredients are dissolved.
 (5) Add Polyose-cellulose solution to remaining amount of water at 25–30° C. slowly, with agitation, until solution is complete.
 (6) Let stand at room temperature until most of entrapped air has escaped from the viscous solution.

(II) Part B:
 (1) Heat water (40°–50° C.).
 (2) Add all ingredients, except flavor, gradually, with agitation.
 (3) Continue to stir until ingredients are dissolved.
 (4) Remove from heat.
 (5) Allow to cool to room temperature.
 (6) Add maple flavor.

(III) Mix gradually, with agitation, Part A to Part B.

EXAMPLE 5

Dietetic lemon pie filling powder

Lemon pie filling powder was prepared with the following components in part by weight as shown:

| | |
|---|---|
| Polyose C | lbs. 3.00 |
| Carboxy methyl cellulose | lb. .4 |
| Gum Arabic | lb. .8 |
| Corn starch | lbs. 1.3 |
| Salt | oz. .3 |
| Lemon oil | oz. .15 |
| Citric acid | oz. .10 |
| Lemon color | oz. .10 |
| Cyclamate+10×saccharin | lb. .03 |

The dry ingredients are carefully blended together to obtain uniform distribution of the ingredients throughout the composition.

Variations in ingredients can be made according to the desire of the person preparing the powder.

EXAMPLE 6

Low calorie French dressing

| | |
|---|---|
| Calcium cyclamate | lbs. 3 |
| Soluble spices (pepper, garlic, onion, cloves) | lbs. 2 |
| Mustard (dry) | lbs. 5 |
| Paprika | lbs. 9 |
| Salt | lbs. 20 |
| Gum tragacanth (food grade) | lbs. 6 |
| Polyose C | lbs. 30 |
| Tomato puree (1.045 sp. gr.) | lbs. 160 |
| White distilled vinegar (10%) | lbs. 180 |
| Vegetable oil | lbs. 50 |
| Benzoic acid (if used) | ozs. 12 |

Water to make 100 gals.

The salt and gum are dispersed, cold, in the vinegar and most of the water, by a suitable high-speed mixer. The Polyose C is thoroughly wet with just enough hot water to dissolve it, and added to the mixture. The tomato puree and the rest of the dry ingredients are added, and finally the oil is added and thoroughly mixed in. While it is not absolutely essential if adequate high-speed mixing is used, it is highly desirable to homogenize the finished dressing before bottling.

Regular salad dressings, whether French dressing, mayonnaise or mayonnaise-type dressing, extended with starch paste, are quite high in calories, ranging from as high as 100 calories per tablespoon down to perhaps one-half of that level. However, with proper care in formulation, either French-type or mayonnaise-type, low-calorie dressings can be made, with as low as 12 to 15 calories per tablespoon, which compare very favorably in appearance, consistency, flavor and overall palatability with the regular high-calorie dressings.

Oil is the major source of calories in both French dressing and mayonnaise, but egg yolk in the latter and sugar in both make very important contributions to the total caloric content, while starch is a significant source of calories in the usual mayonnaise-type salad dressing. With proper use of Polyose non-nutritive gums and other stabilizers, it is possible to reduce greatly the amounts of oil, egg yolk and starch used, but at least some oil in both types, and small amounts of starch and egg yolk in the mayonnaise-type, are required for appearance, texture and flavor. However, sugar can be eliminated almost entirely, replacing it with the completely non-caloric sweetener, calcium cyclamate or other cyclamate salts either alone or in combination with saccharin.

EXAMPLE 7

Low calorie salad dressing

| | |
|---|---|
| Calcium cyclamate | lbs. 1½ |
| Mannitol | lbs. 6 |
| Soluble spices (pepper, garlic, onion, etc.) | lbs. 7½ |
| Mustard (dry) | lbs. 5 |
| Salt | lbs. 6 |
| Citric acid | lbs. 4 |
| Sodium citrate | ozs. 21 |
| Modified starch (pregelatinized) | lbs. 22½ |
| Polyose B | lbs. 19½ |
| White distilled vinegar (10%) | lbs. 160 |
| Egg yolks (10% salt) | lbs. 60 |
| Vegetable oil | lbs. 60 |
| Benzoic acid (if used) | ozs. 12 |

Water to make 100 gallons.

All dry ingredients are dispersed in the water and vinegar, first wetting the Polyose B with hot water as above, and this slurry is heated, with vigorous mixing, to 185–190° F. for at least 3 or 4 minutes, to cook the starch and pasteurize the mixture. Then it is cooled to 100° F. or lower. The egg yolks are whipped, in another vessel, about a third of the starch paste worked in; then the balance of the starch paste and the oil are added, mixed thoroughly, and preferably homogenized before packaging.

EXAMPLE 8

Chocolate syrup topping

Chocolate syrup topping was prepared having a volume consistency and appearance comparable to that of a normal sugar containing composition. The following components in part by weight were used as shown:

| | |
|---|---|
| Cocoa powder | lb__ .25 |
| Polyose C | lb__ .35 |
| Water | lb__ .25 |
| Condensed milk | lb__ .05 |
| Cyclamate | lb__ .010 |
| Saccharin | lb__ .002 |
| Vanilla extract | lb__ .003 |

The dry ingredients were first carefully mixed together and then water, condensed milk and vanilla extract were added. The whole was thoroughly mixed in a blender.

Other toppings can be prepared having a volume, consistency and appearance comparable to that of normal carbohydrate containing composition.

Other Polyoses can be used in these formulations provided they are used in amounts that will give normal viscosity.

Sweeteners can be used in any desired proportions.

The claims are:

1. A dietetic fluid food composition thickened with at least 3 percent by weight of a glucose polymer derived from starch by depolymerization followed by heat polymerization to such an extent that between 40 and 67 percent solids give a viscosity of 20 to 100 poises at 70° F.

2. A dietetic fluid food composition thickened with at least 3 percent by weight of a glucose polymer derived from starch by depolymerization followed by heat polymerization to such an extent that between 40 and 67 percent solids give a viscosity of 20 to 100 poises at 70° F., said composition also containing at least .002 percent by weight of a sweetener selected from the group consisting of cyclamate and saccharin, such that:

Weight percent of cyclamate+10×weight percent of saccharin=.05 to 1.5 weight percent of product 3. A dietetic fluid food composition containing between 3 and 80 composition weight percent of a glucose polymer thickener derived from starch by depolymerization followed by heat polymerization to such an extent that between 40 and 67 percent solids give a viscosity of 20 to 100° poises at 70° F., the composition also containing between .002 and 5 composition weight percent of a mixture of sweeteners selected from the group consisting of saccharin and cyclamate, such that:

Weight percent of cyclamate+10×weight percent of saccharin=.05 to 1.5 weight percent of product 4. The composition according to claim 3 wherein the composition is a beverage.

5. The composition according to claim 3 wherein the composition is a syrup.

6. The composition according to claim 3 wherein the composition is a canned fruit.

7. The composition according to claim 3 wherein the composition is a pudding.

8. The composition according to claim 3 wherein the composition is a salad dressing.

9. A dietetic food composition comprising between 3 and 80 weight percent of a glucose polymer derived from starch by depolymerization followed by heat polymerization to such an extent that between 40 and 67% solids give a viscosity of 20 to 100 poises at 70° F. as a thickener and between about 0.002 and 5 weight percent of at least one sweetener selected from the group consisting of cyclamates and saccharin.

10. A dietetic fluid food composition comprising between 3 and 80 weight percent of a glucose polymer derived from starch by depolymerization followed by heat polymerization to such an extent that between 40 and 67% solids give a viscosity of 20 to 100 poises at 70° F. as a thickener and between about 0.002 and 5 weight percent of at least one sweetener selected from the class consisting of cyclamate and saccharin such that:

Weight percent of cyclamate+10×weight percent of saccharin=.002 to 5 weight percent of product

References Cited in the file of this patent

UNITED STATES PATENTS

| | | |
|---|---|---|
| 1,801,053 | Meigs | Apr. 14, 1931 |
| 2,210,856 | Hellwig et al. | Aug. 6, 1940 |
| 2,302,511 | Wallach | Nov. 17, 1942 |
| 2,406,585 | Buchanan et al. | Aug. 27, 1946 |
| 2,563,014 | Durand | Aug. 7, 1951 |
| 2,629,665 | Gordon | Feb. 24, 1953 |

OTHER REFERENCES

"Making Good Sugar-Free Drinks," by Sandri, Food Engineering, May 1953, pp. 79 and 196.